United States Patent [19]

Klautschek

[11] 4,087,851
[45] May 2, 1978

[54] CIRCUIT ARRANGEMENT FOR SUPPLYING AN INDUCTIVE LOAD

[75] Inventor: Herwig Klautschek, Furth, Germany

[73] Assignee: Siemens Aktiengesellschaft, Munich, Germany

[21] Appl. No.: 682,152

[22] Filed: Apr. 30, 1976

[30] Foreign Application Priority Data

May 6, 1975 Germany .............................. 2520158

[51] Int. Cl.² ............................................ H02M 7/515
[52] U.S. Cl. ...................................... 363/96; 318/227; 363/138
[58] Field of Search ................... 34/4, 5, 45 C, 45 ER; 318/227; 363/135, 95, 136, 96, 137, 138

[56] References Cited

U.S. PATENT DOCUMENTS

| 3,262,036 | 7/1966 | Clarke et al. | 321/45 C |
| 3,622,863 | 11/1971 | King | 321/45 C |
| 3,815,003 | 6/1974 | Wiart | 318/227 |

FOREIGN PATENT DOCUMENTS

| 1,358,174 | 3/1964 | France | 321/45 C |
| 1,208,803 | 1/1966 | Germany | 321/45 C |
| 2,051,409 | 4/1972 | Germany | 321/45 R |
| 969,878 | 9/1964 | United Kingdom | 321/45 R |
| 1,288,471 | 9/1972 | United Kingdom | 321/45 R |

*Primary Examiner*—William M. Shoop
*Attorney, Agent, or Firm*—Kenyon & Kenyon, Reilly, Carr & Chapin

[57] ABSTRACT

A circuit arrangement is disclosed for supplying an electric machine from a d-c voltage source. The circuit arrangement comprises a self-commutating inverter having valve branches that can be fired and extinguished and d-c voltage inputs to which electronic switching members are connected. In accordance with the invention, a capacitor is connected to the output of the inverter via a rectifier, and the d-c voltage outputs of the latter are connected via current paths with the poles of the d-c voltage source. To obtain at least partial recovery of the energy stored in the capacitor ohmic resistors are arranged in the current paths. Complete energy recovery is, in turn, realized by arranging controlled electronic valves in the current paths.

3 Claims, 10 Drawing Figures

CIRCUIT ARRANGEMENT FOR SUPPLYING AN INDUCTIVE LOAD

BACKGROUND OF THE INVENTION

1. Field of the Invention

The invention relates to a circuit arrangement for supplying a single or multi-phase inductive load from a d-c voltage source and, in particular, a circuit arrangement of the type comprising a self-commutating inverter having valve branches that can be fired and extinguished and d-c voltage inputs to which are connected electronic switching members.

2. Description of the Prior Art

In inverters with forced commutation and phase sequence quenching, quenching capacitors whose charge is reversed by the load current during each commutation cycle are arranged between the valve branches. If an inductive load and in particular an electric machine, is connected to the inverter, the voltage at the quenching capacitors can increase during the commutation process beyond the voltage induced by the load. However, the voltages at the quenching capacitors must not become too high or the voltage stress on the controlled valves of the inverter as well as the dielectric stress on the insulation of the load will become excessive.

The size of the quenching capacitors in the aforesaid inverter arrangements must, therefore, be chosen to best satisfy two countervailing requirements. On the one hand, the aforesaid need to limit the voltage on the quenching capacitors requires quenching capacitors with relatively large capacities. On the other hand, the need to maintain a sufficiently long protection time so as to be able to reliably extinguish the valves of the inverter dictates the need for quenching capacitors having relatively small capacities.

It is an object of the present invention to provide a circuit arrangement for supplying an inductive load in which an inverter with forced commutation is employed and in which the quenching capacitors between the individual valve branches of the inverter can be as small as possible and can be designed so as to only satisfy the protection time requirement of the controlled valves.

SUMMARY OF THE INVENTION

In accordance with the principles of the present invention, the above and other objectives are accomplished in a circuit arrangement of the above type by further including therein a rectifier at the inverter output and by further providing therein an additional or supplemental capacitor which is connected to the rectifier. Moreover, current paths which are connected to the d-c voltage outputs of the recitifier and are adapted to be connected to the respective poles of the d-c voltage source are also provided.

In the circuit arrangement of the invention, the large capacity requirement of the quenching capacitors is now satisfied by the aforesaid supplemental capacitor, whose capacity is selected to be large. As a result, the quenching capacitors of the inverter need only be designed to provide sufficient protection time for the controlled semiconductor valves thereof and, therefore, can now have a relatively small capacity. This, in turn, is advantageous, as the quenching capacitors must handle currents of changing polarity and, possibly, of high frequency and, therefore, are expensive to manufacture. The additional capacitor, on the other hand, may be in the form of a simple electrolytic capacitor, as it is charged with d-c voltage only.

More particularly, during each commutation cycle the supplemental capacitor receives a certain amount of the energy normally taken up by the quenching capacitors. Although it would be possible to convert this energy into heat by an ohmic resistor shunted across the capacitor, this would result in continuous losses. Thus, as above-indicated, in the present circuit arrangement current paths are provided for connecting the d-c voltage outputs of the recitifier and, therefore, also the electrodes of the supplemental capacitor to the poles of the d-c voltage source which supplies the inverter. Thereby, partial or complete recovery of the energy fed to the additional capacitor during the commutation process can be realized.

In one embodiment of the invention, which can be advantageously employed where no surges in d-c voltage are permitted, two partial supplemental capacitors are employed, each being connected to a d-c voltage output of the rectifier and adapted to be connected to a pole of the d-c voltage source. Additionally, a parallel current path is associated with each partial capacitor. In this case, the two partial capacitors may also be realized as simple electrolytic capacitors.

In another embodiment of the invention, ohmic resistors are inserted into the current paths between the d-c voltage outputs of the rectifier and the poles of the d-c voltage source. This results in partial recovery of the energy fed to the additional capacitor during the commutation process.

Complete recovery of the energy fed to the additional capacitor is realized according to a further embodiment of the invention, by inserting controlled electronic valves into the current paths between the d-c outputs of the recitifier and respective poles of the d-c voltage source. This embodiment is preferable in installations with larger power ratings, where the advantage of nearly lossless energy recovery justifies the higher cost of the controlled valves.

BRIEF DESCRIPTION OF THE DRAWINGS

The above and other features and aspects of the present invention will become apparent upon reading the following detailed description in conjunction with the accompanying drawings, in which:

FIG. 2b illustrates operation of certain control elements of the circuits of FIGS. 1 and 2a;

FIG. 3b illustrates waveform diagrams of certain signals present in the circuit of FIG. 3a.

FIG. 4b illustrates waveform diagrams for signals present in the circuit of FIG. 4a;

FIG. 5b and 5c show the conducting states of certain control elements of the circuit of FIG. 5a.

DETAILED DESCRIPTION

Figure 1:
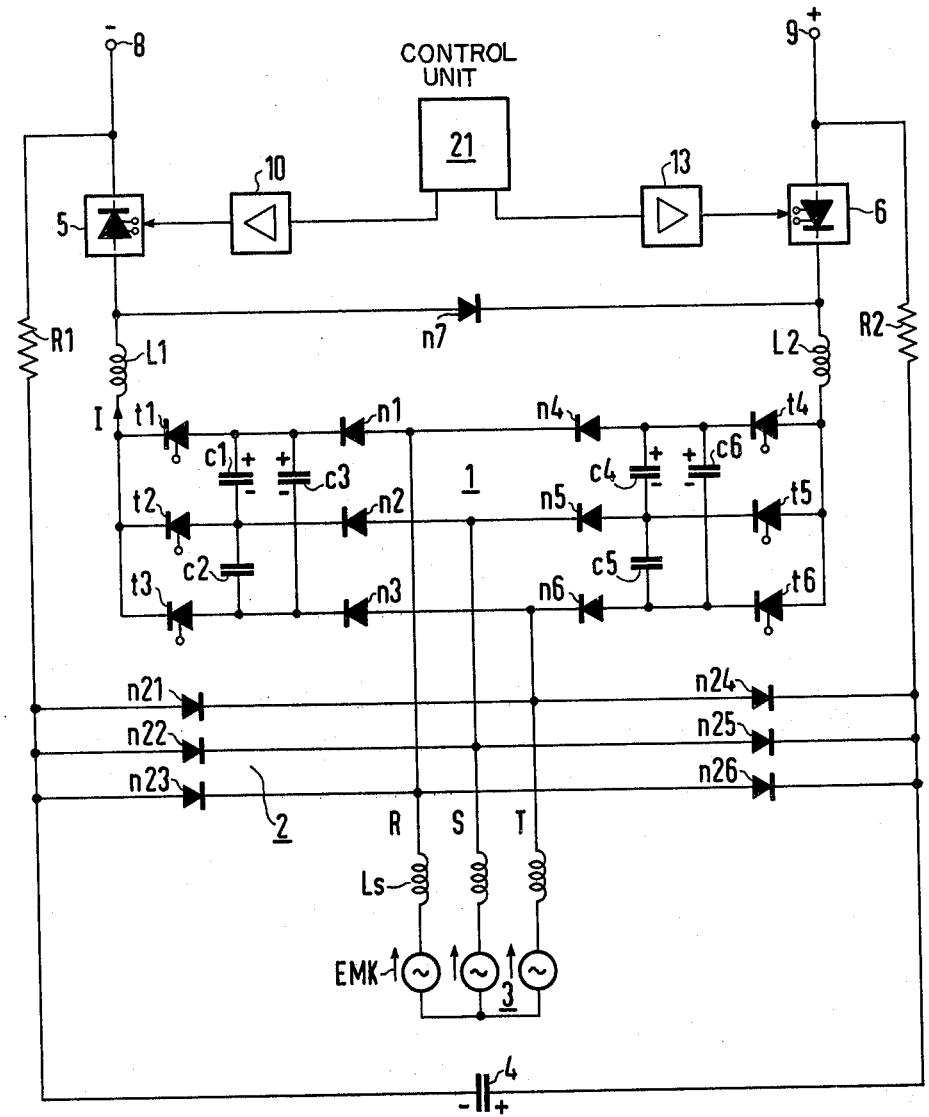
FIG. 1 shows a first embodiment of a circuit arrangement in accordance with the principles of the present invention.

FIG. 1 shows a circuit arrangement in accordance with the principles of the present invention. The circuit is to supply an electric machine 3, which may, for example, be an asynchronous machine or a synchronous machine with forced commutation. The machine has been schematically illustrated as sources of electromotive force EMK which are in series with respective stray reactances Ls. The circuit arrangement comprises an inverter 1 having valve branches that can be fired and extinguished. As shown, the inverter is constructed of thyristors $t1$ to $t6$ which are in series with diodes $n1$ to $n6$, respectively. Additionally, quenching capacitors $c1$ to $c6$ are connected between the individual valve branches. Preferably, the inverter 1 should be designed as a self-commutating inverter.

The d-c voltage inputs of the inverter are connected, via smoothing chokes L1 and L2 and via d-c control elements 5 and 6, which function as electronic switching members, to the poles 8 and 9 of a d-c voltage source. The d-c voltage source may, for example, be a battery, a d-c bus bar or an intermediate d-c link in the output of an uncontrolled rectifier which is connected on the input side to a single-or multiphase a-c network. The supply voltage present at the poles 8, 9 can be set by cycling the d-c control elements 5 and 6. Control of the two d-c control elements 5 and 6, is carried out by a control unit 21. Signals from the latter are fed to elements 5 and 6 via respective pulse amplifiers 10 and 13. A bypass diode $n7$ is also associated with the d-c control elements 5, 6.

Operation of the circuit of FIG. 1 will be explained by first examining the commutation of the current I from the phase R to the phase S of the machine 3. Initially, the current I flows from the positive pole 9 of the d-c voltage source through the d-c control element 6, which is controlled into conduction, the smoothing choke L2, the thyristor $t4$, the diode $n4$, the phases R and T of the machine, the diode $n3$, the thyristor $t3$, the smoothing choke L1 and the d-c control element 5, which is likewise controlled into conduction, and back to the negative pole 8 of the d-c voltage source. During this time, the quenching capacitors $c3$, $c2$, $c4$, $c6$ are charged with the polarities indicated.

The commutation is initiated by firing the thyristor $t5$, which is to take over the current. After such firing, the current I passes to the thyristor $t5$ due to the voltage on the quenching capacitor $c4$. The current now flows through the thyristor $t5$, is then divided, via the parallel connected quenching capacitor $c4$, between the two quenching capacitor branches and returns via the diode $n4$, the phases R and T of the machine, as well as the diode $n3$ and the thyristor $t3$. During this time, the quenching capacitor $c4$ is discharged and charged with the opposite polarity. As soon as the voltage on the quenching capacitor $c4$ exceeds the voltage between the phases R and S induced in the machine by the main field the diode $n5$ becomes conducting. The current is now decreased in the phase R and increased in the phase S. The commutation process is completed when the current I has passed completely to the diode $n5$ and, therewith, to the phase S.

During the aforesaid commutation process, it is important that the quenching capacitors are not charged beyond the e.m.f. of the machine 3, as the energies converted in the stray inductances Ls pass to the quenching capacitors. In order to ensure this, the circuit arrangement is provided with an additional or supplemental capacitor 4 which is connected to the output of the inverter 1 via a rectifier 2. The rectifier 2 is as an uncontrolled rectifier having the diodes $n21$ to $n26$ connected in a three-phase bridge circuit.

As can be appreciated, with the inverter 2 and the capacitor 4 included in the circuit, as soon as one of the quenching capacitors, e.g., $c4$, is charged during the commutation process to the value of the voltage at the capacitor 4, the corresponding diodes, e.g., $n23$ and $n25$, in the rectifiers 2 are brought into conduction. The capacitor 4 is thereby shunted across the respective quenching capacitor, e.g., $c4$. By selecting the capacity of the capacitor 4 to be considerably larger than the capacity of the quenching capacitor, only a relatively small amount of recharging takes place at the latter. Thus, in the above-described case, when the current I passes completely from the phase R to the phase S, the commutation process is completed, and the current in the phase R and the current through the diodes of the rectifier 2 becomes zero.

As above indicated, with each commutation cycle of the inverter 1, a certain amount of energy passes to the capacitor 4, which is discharged with the polarity shown. In order to prevent capacitor 4 from continuing to be discharged to higher and higher voltages, the circuit arrangement is additionally provided with current paths which connect the output of the rectifier 2 and, thus, the output of capacitor 4 to the terminals of the d-c voltage source. In particular one current path which includes a resistor R1 connects one d-c voltage output of the rectifier to the pole 8 of the d-c voltage source. Another current path comprising a resistor R2, in turn, connects the other d-c voltage output to the pole 9 of the d-c voltage source. With the ohmic resistors R1 and R2 in the current paths a fraction of the energy supplied to the capacitor 4 is returned to the d-c voltage source. This fraction corresponds to the ratio of the d-c supply voltage between the poles 8, 9 to the voltage at the capacitor 4. The remaining energy is converted into heat in the resistors.

With the circuit arrangement of FIG. 1, motor operation of the electric machine 3 is possible.

Figure 2A:
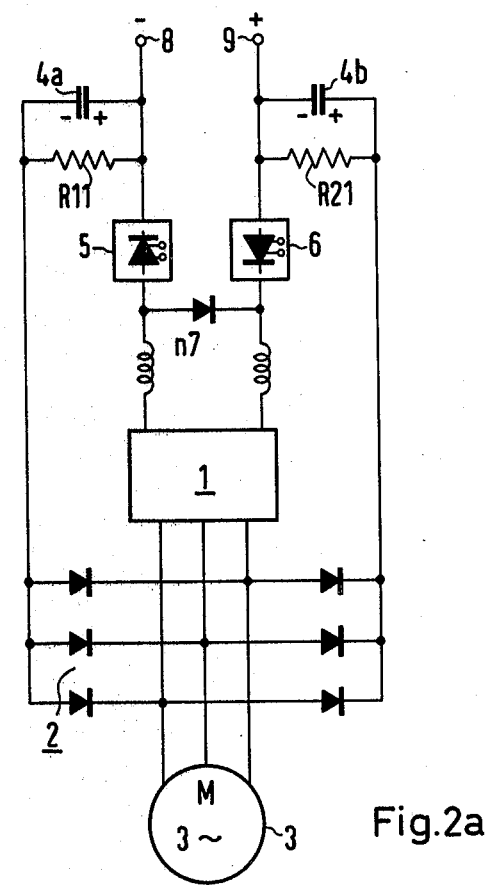
FIG. 2a shows a second embodiment of a circuit arrangement in accordance with the principles of the present invention.

FIG. 2a shows a second embodiment of a circuit arrangement in accordance with the principles of the present invention. In this arrangement the supplemental capacitor is segmented or split into two partial capacitors 4a and 4b each of which is connected between a respective d-c voltage output of the rectifier 2 and a respective pole 8 and 9 of the d-c voltage source. The partial capacitors 4a and 4b are additionally shunted by parallel current paths which include the ohmic resistors R11 and R21, respectively. In this embodiment, the partial capacitors 4a and 4b may also be electrolytic capacitors.

The operation of the circuit of FIG. 2a and the efficiency of the circuit correspond to the operation and efficiency of the circuit of FIG. 1. However, while voltage surges of the supply voltage may occur in the circuit of FIG. 1, such voltage surges are inhibited in the circuit of FIG. 2a.

Figure 2B:
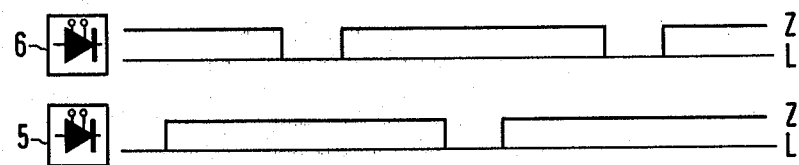

As shown diagrammatically in FIG. 2b, the two d-c control elements 5 and 6 of the circuit arrangements of FIGS. 1 and 2a can be controlled alternatingly into conduction and cut-off. In FIG. 2b, the current-conducting state of the d-c control elements is designated with a Z (fired) and the cut-off state with an L (extinguished).

Figure 3A:
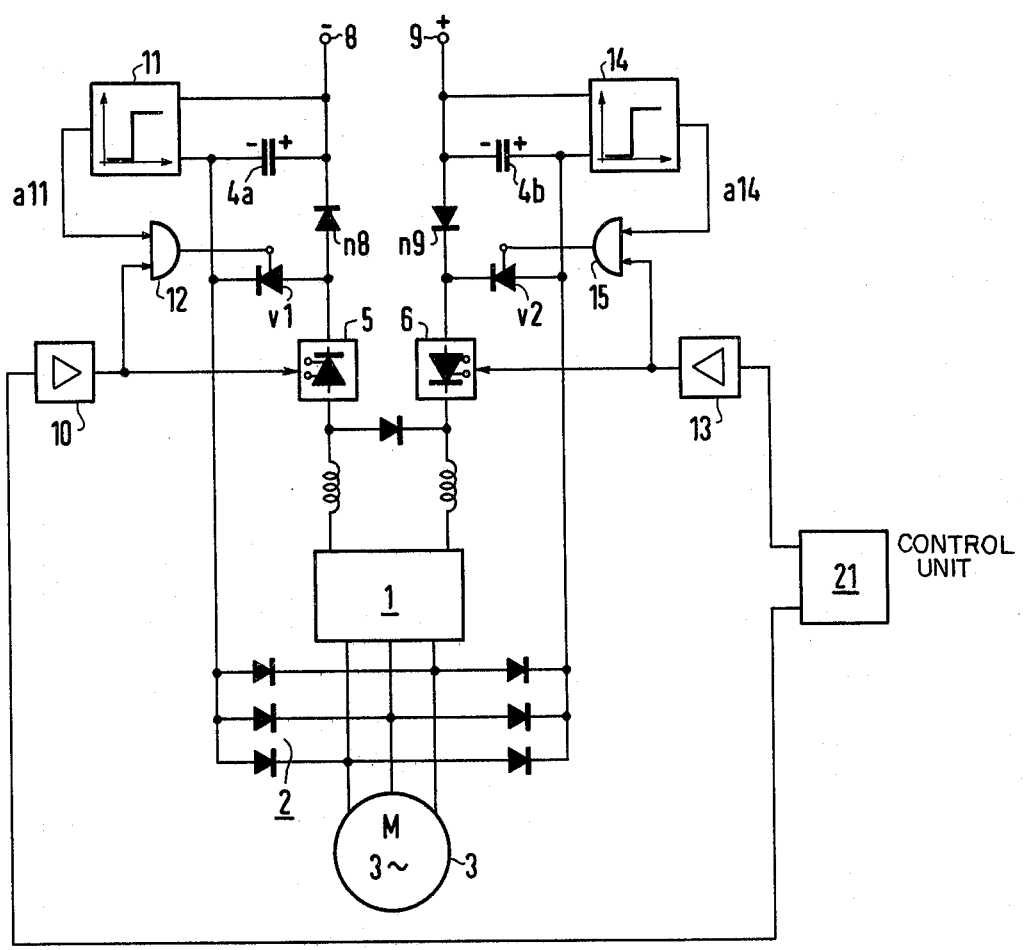
FIG. 3a shows the circuit arrangement of FIG. 2a modified so as to permit lossless energy recovery.

The circuit arrangement of FIG. 3a corresponds to that of FIG. 2a, with the exception that the circuit has been modified to obtain lossless energy recovery. In particular, the ohmic resistors in the current paths have been replaced by controlled electronic valves v1 and v2. In addition, decoupling diodes n8 and n9 have also been provided.

In this arrangement, the voltage at the partial capacitors 4a and 4b, respectively, is monitored by limit indicators 11 and 14 which, preferably, operate at low potential. If the voltage at one of the partial capacitors 4a and 4b exceeds a predetermined threshold value, the controlled electronic valve v1 or v2 associated with the respective d-c control element 5 or 6 is also fired, if the element 5 or 6 fires. To accomplish this the firing signals being supplied by the control unit 21 to the d-c control elements 5 and 6 are additionally fed to logic members 12 and 15 whose conduction states are controlled by the respective output signals of the limit indicators 11 and 14. If, for example, the d-c control element 5 and the controlled electronic valve v1 are fired, the current flows via the valve v1 and the partial capacitor 4a instead of through the diode n8. The partial capacitor 4a is thereby discharged. If on the other hand, the d-c control element 6 and the valve v2 are fired, then the current flows via the partial capacitor 4b and the valve v2 rather than through diode n9. In this case, the partial capacitor 4b is thus discharged. The quenching of the two separate valves v1 and v2 is accomplished by cutting-off of their associated d-c control elements 5 and 6.

Figure 3B:
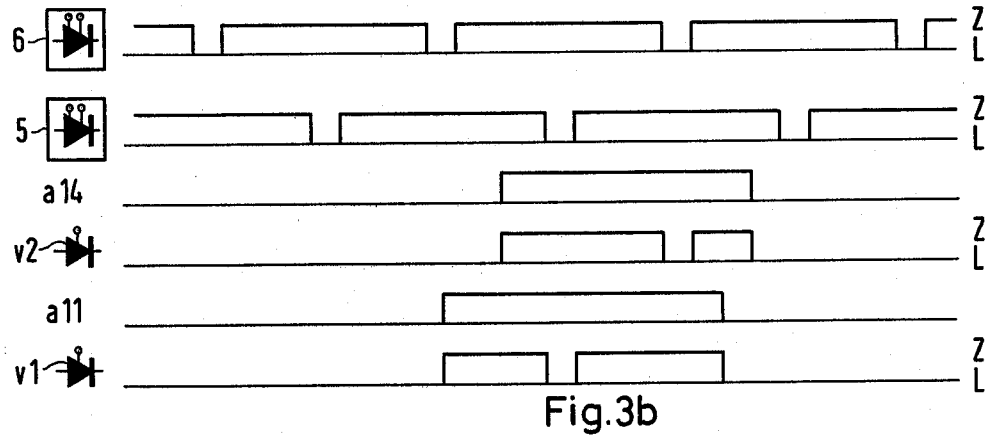

FIG. 3b shows schematically the current-conducting and inhibiting states of the d-c control elements 5 and 6 and the output signal a14 of the limit indicator 14. Also shown are the current-conducting and inhibiting states of the valves v1 and v2 and the output signal a11 of the limit indicator 11.

Figure 4A:
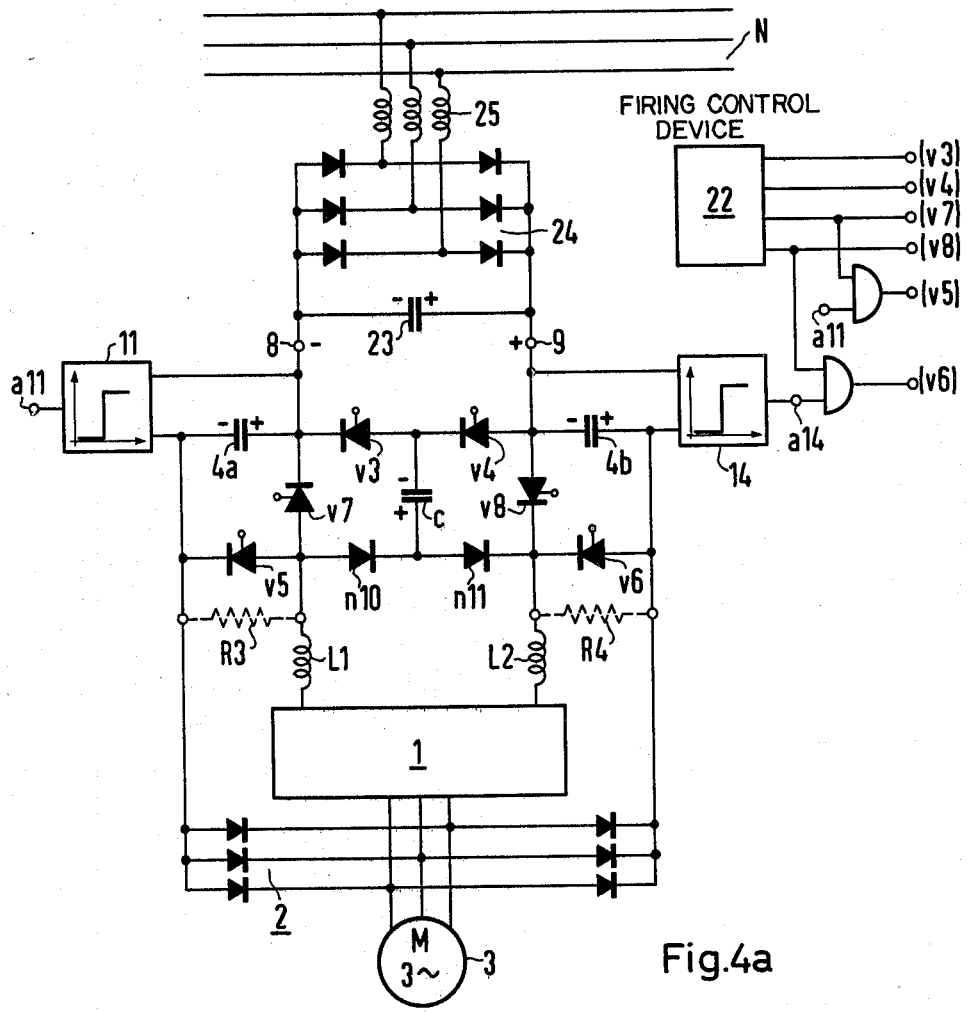
FIG. 4a shows a third embodiment of a circuit arrangement in accordance with the principles of the present invention.

FIG. 4a shows another embodiment of a circuit arrangement in accordance with the principles of the invention example of FIG. 4a. As shown, in this case a circuit comprising controlled electronic valves v3, v4, v7 v8, diodes n10 and n11 and a quenching capacitor C is arranged at the inputs of the inverter 1 instead of the d-c control elements 5 and 6. This eliminates the need for reversing diodes, reversing chokes as well as a quenching capacitor which are commonly provided in the d-c control elements. Furthermore, there are no reversed currents and the semiconductor components are stressed only by the load current and can, therefore be made smaller.

Also in this embodiment, the d-c voltage across the terminals 8 and 9 is derived from the output of a capacitor 23. The latter capacitor, in turn, is connected across the output of a rectifier 24, whose input is connected via inductances 25 to a supply network N.

Operation of the circuit of FIG. 4a will be explained by assuming that the valves v7 and v8 receive firing pulses from the firing control device 22. In such case, the load current flows from the positive pole 9 via the valve v8, the smoothing choke L2, the inverter 1, the smoothing choke L1 and via the valve v7 back to the negative pole 8. If blocking is desired, i.e., bypass operation, then the controlled electronic valve v4 is fired, as the quenching capacitor C has the indicated polarity. Upon firing the valve v4, the load current no longer flows via the valve v8, which is now cut-off, but rather flows via the valve v4, the quenching capacitor C, the diode n11, the inverter 1 and via the valve v7 back to the pole 8. The quenching capacitor C is discharged and charged with the opposite polarity. When the voltage at the quenching capacitor C reaches the voltage between the poles 8 and 9, the diode n10 is brought into conduction. The load current now flows from the inverter 1 via the smoothing choke L1, the diodes n10 and n11 and via the smoothing choke L2 back into the inverter 1, and the quenching capacitor C acquires the polarity opposite to that indicated.

If a current pulse is again to be taken from the d-c voltage source, the valves v7 and v8 are again fired by the firing control device 22. The load current is thereby made to pass immediately from the diodes n10 and n11 to the valves v7 and v8. If blocking is now desired again, the controlled electronic valve v3 is fired. Now, the previously described quenching and commutation cycle takes place in the left hand of the circuit. The quenching capacitor C thereby again acquires its originally indicated polarity.

After the valves v7 and v8 are fired into conduction once more, the described initial state is reached again.

If the voltage at the two partial capacitors 4a and 4b exceeds a predetermined value, which is again ascertained by the two limit indicators 11 and 14, the valves v5 and v6 are also fired when the valves v7 and v8 conduct. In such case, the load current flows via the partial capacitor 4b and the valve v6 or the valve v5 and the partial capacitor 4a. The partial capacitors 4a and 4b are discharged thereby. The valves v5 and v6 are extinguished when the valves v3 and v4 are fired.

As above indicated, the circiut arrangement of FIG. 4a includes a control unit 22 which delivers firing pulses to the valves v3, v4, v7 and v8. The firing pulses for the valves v7 and v8 are also fed to logic members which are controlled into conduction or cut-off by the output signals a11 and a14 of the limit indicators 11 and 14, rspectively. The outputs of the two logic members, in turn, are connected to the control electrodes of the valves v5 and v6, respectively.

Figure 4B:
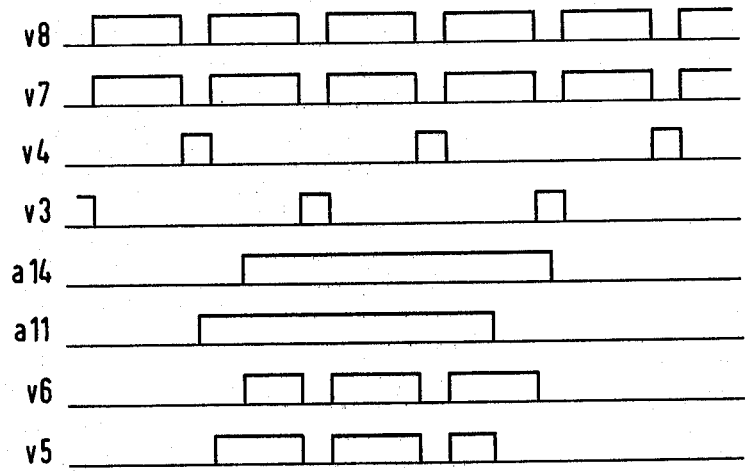

FIG. 4b illustrates pulse diagrams for the valves v3 to v8 and the output signals a11 and a14 of the two limit indicators 1 and 14 of the circuit of FIG. 4a. The circuit arrangement of FIG. 4a can also be controlled so that the valves v5 and v6 are fired, instead of the valves v7 and v8, when the voltages of the partial capacitors 4a and 4b are exceeded.

If the circuit of FIG. 4a is designed for low power, where complete recovery of the energy that has passed to the partial capacitors 4a, 4b is not desired, then the ohmic resistors described in the circuit of FIGS. 1 and 2a may be used in place of the controlled electronic valves v5 and v6. These resistors are shown dotted line in FIG. 4a and are designated as R3 and R4. This reduces the cost of the circuitry considerably, but on the other hand, only part of the energy is fed back into the intermediate link.

The circuit of FIG. 4a is suited for motor operation of electric machine 3.

Figure 5A:
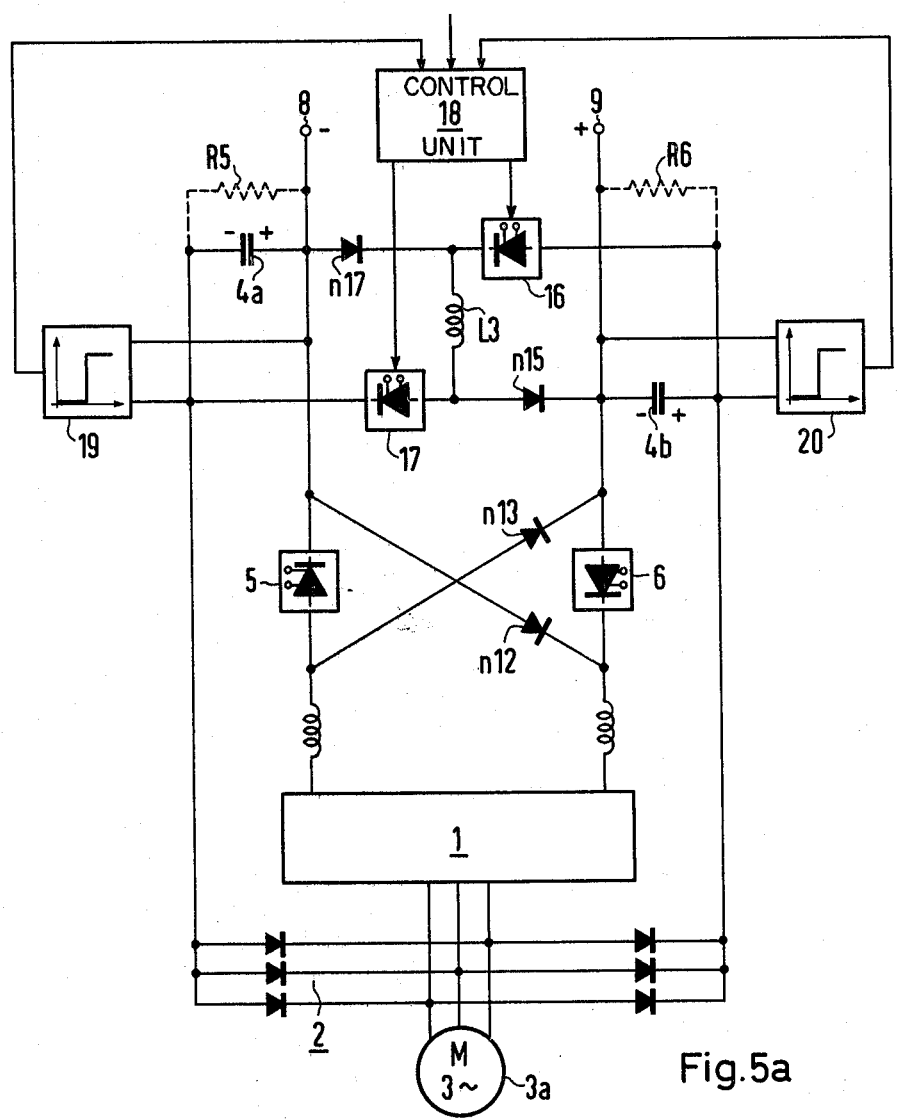

FIG. 5a shows a circuit arrangement in accordance with the invention which enables the electric machine being supplied thereby to function both as a motor and a generator. In this circuit, the two d-c control elements 5 and 6 are associated with the diodes n12 and n13 and are connected into the d-c voltage inputs of the inverter 1 in the manner shown. A circuit having the aforesaid connection for elements 5 and 6 is known as a "four-quadrant circuit" and is described in the book "Thyristors in Technical Applications", vol. 1: "Converters with Forced Commutation" by Manfred Meyer, 1967, pages 99 and 100.

In order to recover the energy from the two partial capacitors 4a and 4b, two additional d-c control elements 16 and 17 are provided. Associated with the latter elements in the manner shown are a choke L3 and diodes n15 and n17.

If one or both d-c control elements 5 and 6 are fired into conduction, the current in the choke L3 rises. By cutting off the d-c control elements 16 and 17, the current in the choke L3 is commutated to the diodes n15 and n17, and, therefore, returned to the input. The two further d-c control elements 16 and 17 are controlled by a control unit 18, which receives a timing signal as well as the output signals from the limit indicators 19 and 20. The limit indicators 19 and 20 monitor the voltage across the partial capacitors 4a and 4b. The control of the two d-c control elements 16 and 17 is, therefore, completely independent of the control (not shown in detail) provided for the d-c control elements 5 and 6 for setting the operation of the asynchronous machine 3a as a motor or a generator.

In the circuit of FIG. 5a partial instead of total recovery of the energy in the capacitors 4a, 4b can be realized by substituting the ohmic resistors R5 and R6, shown dotted in line, for the d-c control elements 16 and 17, the diodes n15 and n17 and the choke L3.

Figure 5B:
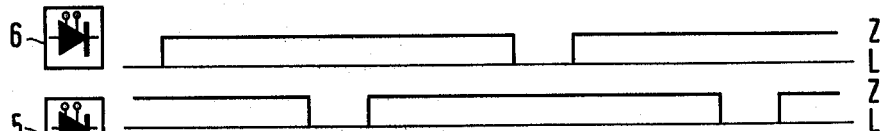
FIG. 5b shows a fourth embodiment of a circuit arrangement in accordance with the principles of the present invention.
Figure 5C:
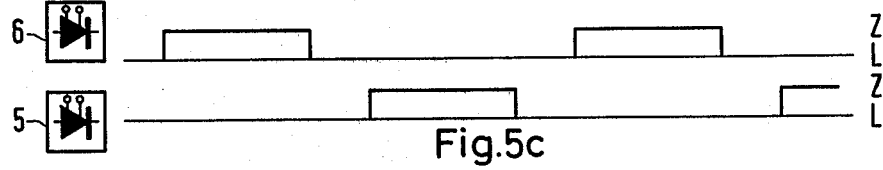

FIG. 5b shows schematically the current-conducting and inhibiting states of the two d-c control elements 5 and 6 for motor operation of the asynchronous machine 3a of FIG. 5a. FIG. 5c on the other hand, shows schematically the current-conducting or inhibiting states of the latter elements for generator operation of the machine. As above-indicated, the control of the d-c control elements 16 and 17 is completely independent of the control of the elements 5 and 6. As shown, either the d-c control element 16 or the d-c control element 17 or both d-c control elements 16 and 17 can be fired. However, it is necessary that the two d-c control elements 16 and 17 are always controlled into cut-off simultaneously.

What is claimed is:

1. A circuit arrangement for supplying an inductive load from a d-c voltage source, said voltage source having first and second output terminals, said circuit arrangement comprising:
   (a) a self-controlled inverter with forced commutation, said inverter having valve branches which can be fired and extinguished and having first and second d-c inputs and a-c outputs;
   (b) a first series circuit coupling said first output terminal of said d-c voltage source and said first d-c input of said inverter, said first series circuit comprising a first decoupling diode, a first electronic switching member and a smoothing choke where said first electronic switching member can be controlled alternatingly into conduction and cutoff;
   (c) a second series circuit coupling said second d-c input of said inverter and said second output terminal of said d-c voltage source, said second series circuit comprising a second switching member and a second decoupling diode, where said second electronic switching member can be controlled alternatingly into conduction and cut-off;
   (d) bypass diode means associated with said inverter; and
   (e) feedback means including:
   (1) a rectifier having a-c inputs and first and second d-c output ports, said a-c inputs being coupled to the a-c outputs of said inverter;
   (2) a first partial capacitor coupling said first output port of said rectifier and said first output terminal of said d-c voltage source;
   (3) a second partial capacitor coupling said second output port of said rectifier and said second output terminal of said d-c voltage source;
   (4) a first controllable electronic valve coupled in a first series arrangement with said first partial capacitor, said first series arrangement being coupled in parallel to said first decoupling diode;
   (5) a second controllable electronic valve coupled in a second series arrangement with said second partial capacitor, said second series arrangement being couple in parallel to said second decoupling diode; and
   (6) first and second means responsive to the voltage across said respective first and second partial capacitors for firing said first and second controllable valves respectively.

2. A circuit arrangement for supplying an inductive load from a d-c voltage source, said voltage source having first and second output terminals, said circuit arrangement comprising:
   (a) a self-controlled inverter with forced commutation, said inverter having valve branches which can be fired and extinguished, and having first and second d-c inputs and a-c outputs;
   (b) a series circuit coupling said first output terminal of said d-c voltage source and said first d-c input of said inverter, said series circuit comprising a first controllable electronic valve and a smoothing choke;
   (c) a second controllable electronic valve coupling said second d-c input of said inverter and said second output terminals of said d-c voltage source;
   (d) first and second controlled electronic quenching valves associated with the first and second controllable electronic valve, respectively;
   (e) a quenching capacitor coupled in common for said first and second controllable electronic valves;
   (f) bypass diode means associated with said inverter; and
   (g) feedback means including:
   (1) a rectifier having a-c inputs and first and second d-c output ports, said a-c inputs being coupled to the a-c ports, said a-c inputs being coupled to the a-c outputs of said inverter;
   (2) a first partial capacitor coupling said first output port of said rectifier and said first output terminal of said d-c voltage source;
   (3) a second partial capacitor coupling said second output port of said rectifier and said second output terminal of said d-c voltage source;
   (4) a third controllable electronic valve coupled in a first series arrangement with said first partial capacitor, said first series arrangement being coupled in parallel to said first controllable electronic valve;
   (5) a fourth controllable electronic valve coupled in a second series arrangement with said second partial capacitor said second series arrangement coupled in parallel with said second controllable electronic valve; and
   (6) first and second means responsive to the voltage across said respective first and second partial capacitors for firing said third and fourth controllable valves respectively.

3. A circuit arrangement for supplying an inductive load from a d-c voltage source, said voltage source having first and second output terminals, said circuit arrangement comprising:

(a) a self-controlled inverter with forced commutation, said inverter having valve branches which can be fired and extinguished, and having first and second d-c inputs and a-c outputs;

(b) a series circuit coupling said first output terminal of said d-c voltage source and said first d-c input of said inverter, said first series circuit comprising a first electronic switching member and a smoothing choke said first electronic switching member being such that it can be controlled alternatingly into conduction and cut-off;

(c) a second electronic switching member coupling said second d-c input of said inverter and said second output terminal of said d-c voltage source, said second electronic switching member being such that it can be controlled alernatingly into conduction and cut-off;

(d) bypass diode means associated with said inverter; and (e) feedback means including:

(1) a rectifier having a-c inputs and first and second d-c output ports, said a-c inputs coupled to the a-c outputs of said inverter;

(2) a first partial capacitor coupling said first output port of said rectifier and said first output terminal of said d-c voltage source;

(3) a second partial capacitor coupling said second output port of said rectifier and said second output terminal of said d-c voltage source;

(4) a choke;

(5) a first series arrangement coupled in parallel to said first partial capacitor said first series arrangement comprising a third electronic switching member, said choke and a first diode, said third electronic switching member being such that it can be controlled alternatingly into conduction and cut-off.

(6) a second series arrangement coupled in parrallel to said second partial capacitor, said second series arrangement comprising a second diode, said choke and a fourth electronic switching member, said fourth electronic switching member being such that it can be controlled alternatingly into conduction and cut-off; and (7) first and second means responsive to the voltage across said respective first and second partial capacitors for switching said third and fourth electronic switching members into conduction, respectively.

* * * * *